United States Patent [19]

Littlefield

[11] 4,169,680
[45] Oct. 2, 1979

[54] METHOD AND APPARATUS FOR MAKING COMPOSITION FRICTION MATERIALS

[75] Inventor: John B. Littlefield, Belle Haven, Va.

[73] Assignee: AMSTED Industries Incorporated, Chicago, Ill.

[21] Appl. No.: 818,831

[22] Filed: Jul. 25, 1977

[51] Int. Cl.² ............................. B01F 13/06; B01F 15/06
[52] U.S. Cl. ............................. 366/139; 366/144; 366/244; 366/309
[58] Field of Search ............... 366/139, 144, 244, 247, 366/245, 249, 250, 279, 282, 292, 309, 341

[56] References Cited
U.S. PATENT DOCUMENTS

| | | | |
|---|---|---|---|
| 2,367,149 | 1/1945 | Smith | 366/309 |
| 3,521,863 | 7/1970 | Graham | 366/139 |
| 3,544,522 | 12/1970 | Hahn | 366/139 |
| 3,751,010 | 8/1973 | Latinen | 366/144 |

*Primary Examiner*—Edward J. McCarthy
*Attorney, Agent, or Firm*—John L. Schmitt; Fred P. Kostka

[57] ABSTRACT

Composition friction materials particularly adapted for use in making railroad brake shoes include an elastomer such as synthetic rubber or natural rubber. The elastomer forms part of a bond for the remaining friction ingredients. The elastomer, solvent and nonsolvent absorbing granular abrasive materials of the composition are mixed in a manner such that the elastomer is quickly reduced to a paste-like consistency to which the remaining ingredients are added and mixed to form pellets which can be conveniently formed into brake shoes.

6 Claims, 3 Drawing Figures

METHOD AND APPARATUS FOR MAKING COMPOSITION FRICTION MATERIALS

BACKGROUND OF THE INVENTION

1. Field of Invention

This invention relates to a method and apparatus for making composition friction materials and particularly to a method and apparatus for making a composition from which brake shoes for the railroad industry may be readily produced.

2. Prior Art

Composition friction materials such as those used to make brake shoes and brake linings are commonly made by either a dry or wet-dry mix procedure.

In the dry mix method the various ingredients are combined and thoroughly mixed, as for example in a Lodige type mixer presently sold in the United States by Littleford Bros. Inc., Cincinnati, Ohio. The dry mixture so produced is then placed in a mold to which heat and pressure are applied to bind the ingredients into a physical friction unit.

The wet-dry mix method is the more commonly used to make composition friction materials for railroad brake shoes. Most such composition friction materials include an elastomer, i.e. a synthetic rubber such as butadiene-styrene, butadiene-acrylonitrile or chlorbutyl rubber, or a natural rubber which is mixed in the presence of a solvent, a resin base and friction materials such as powdered iron grit, lead sulfide and other fillers. After sufficient agitation and exposure to the solvent, the elastomer becomes sufficiently solvated or dissolved to allow dispersion therein of the balance of the fillers, resin curing agents and reinforcing fibers and to permit blending with a resin solution. This wet mix is then opened as in a hammermill and dried in trays in a circulating oven to remove substantially all of the solvent. The dry product then may be briquetted and then cured under heat and pressure in a mold to the desired shaped friction body.

The wet-dry procedure offers a number of distinct advantages over the dry mix procedure in the forming of composition friction materials for making railroad brake shoes.

Firstly, high percentage, heavy granular fillers such as iron grit, desirable in railroad brake shoes, remain dispersed and suspended throughout the mixture and is not gravitationally separated as occurs when using the dry-mix procedure. Secondly, the use of elastomeric materials has been found advantageous in producing a high performance railroad brake shoe and such material cannot be readily used in a dry mix procedure. Lastly, a resin binder, also a desirable ingredient, can only be effectively handled and utilized in the presence of a solvent. As used herein, any brake shoe mixture in which a solvent is used defines a wet-dry procedure.

U.S. Pat. No. 3,227,249 discloses a wet-dry mixing method for preparing a friction composition for use in making railroad brake shoes including generally the following steps:

1 a mixture of an elastomer, partially cured cashew nut-shell oil resin, reinforcing fillers and a curing agent is blended in a rubber mill or a banbury type mixer;

2 the mixture of Step 1 is formed into a sheet;

3 the sheet stock is soaked in a solvent such as naptha or toluol in a closed container for a sufficient time period (24 hours) to swell the sheet mixture;

4 granular filler, friction modifiers and fibers are added to the swelled mixture;

5 the composite of Step 4 is mixed with an intensive mixer such as a sigma blade or dispersion blade mixer with a pressure lid to form a wet lumpy mix;

6 the mix of Step 5 is granulated with a hammermill to reduce the size of lumps; and 7 the mixture of Step 6 is dried in flat trays for proximately 15 hours at 150° F. in an indirectly fired air oven to drive off the solvent.

The dried mix of Step 7 then may be formed into a briquette in any physical shape desired.

SUMMARY OF THE INVENTION

The method of this invention comprising mixing the same ingredients as heretofore were utilized thereby to produce a friction material having similar physical characteristics and frictional qualities.

A granular elastomer such as a crumbed rubber, a solvent, the granular nonporous fillers having superior abrasive and cutting qualities and a curing agent for the elastomer are placed in an intensive mixer which is sealed from the atmosphere and to which heat is applied to heat the ingredients held therein.

The mixer is operated several minutes at an elevated temperature until the elastomer is solvated, i.e. becomes paste-like. The rapid solvation of the elastomer results from the cutting action of the granular fillers which reduces the size of the elastomer crumb thereby permitting the warmed solvent to more effectively soften and break up the elastomer. Moreover, the amount of solvent required to render the elastomer as a paste is maintained at a minimum because the granular fillers added are nonsolvent absorbing. In this manner, only such quantity of solvent required to solvate the elastomer need be added.

After solvation, further ingredients such as porous fillers, friction modifiers, resin curing agent and fibers are added and mixed for a relatively short time. Then a liquid resin is selectively added. Also, a vacuum is slowly drawn on the mixer to evaporate the solvent. To prevent the mixture from cooling because of the evaporation of the solvent under the vacuum, heat is added. The solvent vapor so removed is condensed and stored for reuse if desired.

During and after the addition of the resin, intense mixing is continued as the vacuum increases significantly. When a significant amount of solvent has evaporated, mixing is continued at a lesser intensity until the mixture is dry. The mixer is then stopped and the mixture now in pellet size with a maximum diameter of one inch is removed from the mixer and ready for further processing.

The process of the present invention for producing friction materials from which railroad brake shoes may be formed has a number of significant advantages over prior processes utilized.

Firstly, the time period for processing a batch of friction material has been reduced significantly allowing a higher utilization of equipment and plant space.

Secondly, the number of manhours required to produce a batch has been reduced to less than one-quarter of the number heretofore required.

A further advantage of this new and useful process is that the process uses only 1/10th of the energy used heretofore. This low energy requirement is of particular significance because of the present national commitment to energy conservation.

A still further advantage of the process of this invention is the controlled use of solvent. Firstly, only sufficient solvent is added to effectively solvate the elastomer. Secondly, the solvent is held in a closed system to prevent environmental damage. Lastly, such solvent that is recovered may be reused so that the quantity of additional solvent required to be added to the reused solvent is reduced to minimize the cost of the solvent significantly.

DESCRIPTION OF THE PREFERRED PROCESS

Figure 1:
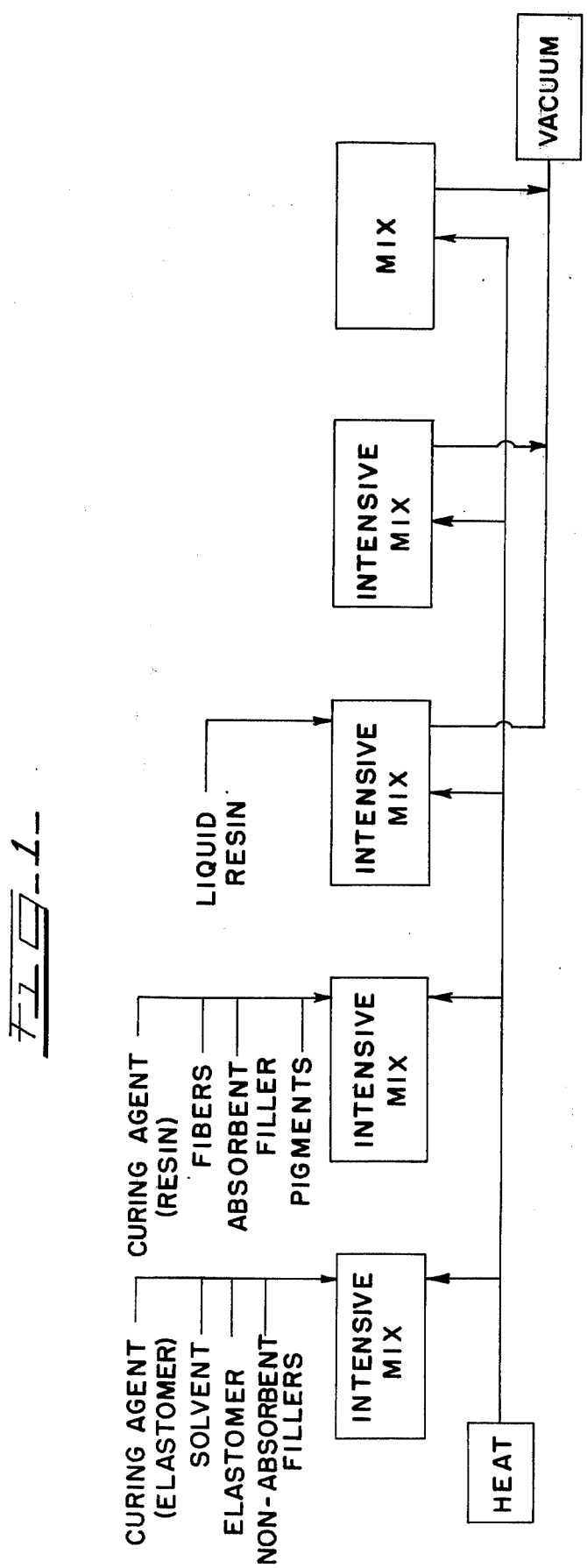
FIG. 1 is a schematic block flow diagram showing the steps of the process of this invention and related material inputs.
Figure 2:
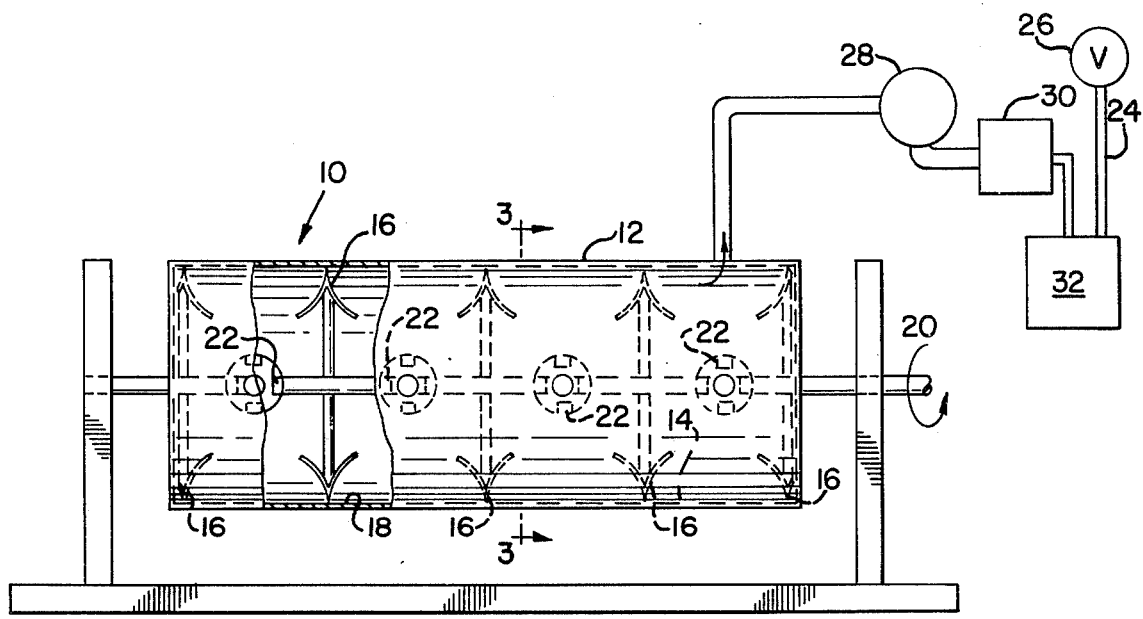
FIG. 2 is a schematic of the Lodige mixer and related equipment used in the process of FIG. 1.
Figure 3:
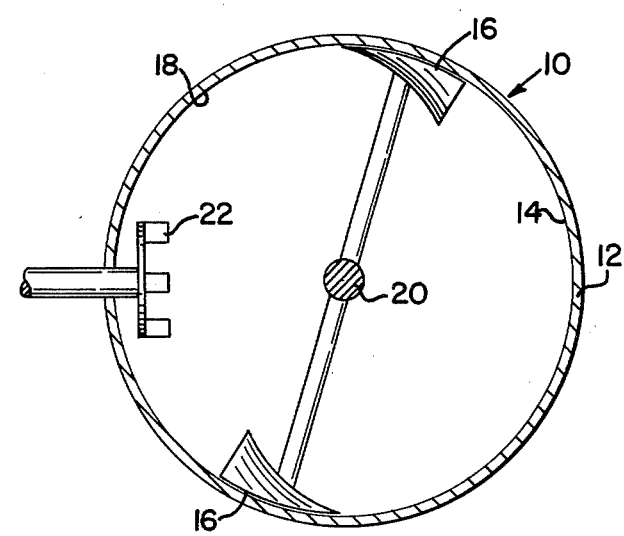
FIG. 3 is a cross-sectional view of the mixer of FIG. 2 along the line 3—3 in FIG. 2.

As its major mixing component, the process of this invention incorporates a "Lodige" mixer of generally well-known German design and made in this country by Littleford Bros. Inc., and designated 10. Heretofore, this mixer had been exclusively utilized in dry mix processes while the well-known Banbury type mixer had been exclusively used in wet-dry mix applications.

The Lodige mixer 10 includes a heatable jacket 12 about a sealable, cylindrical-shaped mixing chamber 14. The chamber 14 is designed to prevent leakage of solvent vapors to the surrounding atmosphere as well as allowing a substantial vacuum to be drawn thereon.

To provide mixing, the Lodige mixer has a plurality of spaced plows or blades 16 which are rotated about an inner circular surface 18 of the chamber 14 by a drive shaft 20 extending through the chamber 14 and proximately aligned with a longitudinal axis of the chamber 14. On the inner surface 18 of the chamber 14 and between adjacent plows 16 are circular choppers 22 which have a plane of rotation positioned proximately perpendicular to a plane of rotation of the plows 16 so as to provide further agitation as the material within the chamber 14 is directed by the plows 16 in the spaces in which the choppers 22 are positioned.

To the mixing chamber is connected in intake 24 of a vacuum source 26. Between the intake 24 of the vacuum source 26 and the mixing chamber 14 is a filter 28 and a conventional condensing means 30 which in turn is connected to a solvent reservoir 32.

As shown in the flow diagram of FIG. 1, a first portion of ingredients comprising a crumbed rubber, for example butadiene-styrene, having a particle size proximating ¼ inch (0.6 cm), an elastomer curing agent such as sulfur, solvent such as toluol and nonabsorbent, abrasive fillers such as iron grit, galena (lead sulfide) and mullite (silicate of aluminum) are placed in the mixer 10 with the jacket 12 having a temperature proximating 200° F. (86° C.). The terms "nonabsorbent" or "nonporous" define a physical characteristic of the fillers in that they are not affected by the solvent. This first portion of the ingredients fills proximately 11% of the holding capacity of the mixer 10. The mixer 10 is sealed and its plows 16 and choppers 22 activated. After proximately five minutes, the rubber crumbs are completely solvated or in paste form with the fillers suspended therein.

The mixer is then stopped, unsealed and absorbent fillers, friction modifiers, a resin curing agent such as hexa and fibers such as asbestos needed to complete the brake shoe composition are added. The mixer 10 is again activated with its plows 16 and choppers 22 operative for a period proximating one minute.

During the next four minutes of mixing, a metered quantity of liquid resin such as a cashew nut shell liquid resin is added to the mixture in the chamber 14 while at the same time the vacuum source 26 is activated.

The heat, vacuum and constant agitation of the plows 16 and choppers 22 gradually drive off a substantial amount of the solvent after about twenty minutes.

At this time, the friction material is in pellet form in which the pellet size ranges from 1/16 to ¼ inch (0.15 to 0.6 cm). This allows the choppers 22 to be deenergized with the plows 16 continuing to rotate for proximately an additional ten minutes when effectively all remaining solvent has evaporated, been recondensed by the condenser 30 and stored in liquid form in the reservoir 32.

While various modifications may be suggested by those versed in the art, it should be understood that I wish to embody within the scope of my contribution to the art all such modifications as reasonably and properly come within the scope of my contribution to the art.

What is claimed is:

1. A method of preparing a composition friction material particularly adapted for forming railroad brake shoe liners, said method comprising the steps of:
   (1) loading into a mixer a first portion of ingredients including an elastomer, a solvent and nonsolvent absorbing materials,
   (2) mixing said first ingredient portion with mixing means carried by said mixer to produce a solvated paste-like substance,
   (3) adding into said mixer a second portion of ingredients including curing agents, friction modifiers, solvent absorbing materials and resin,
   (4) energizing a vacuum source connected to said mixer to draw off said solvent in said mixture,
   (5) mixing said first and second portions with said mixing means to produce a mixture of said ingredients,
   (6) adding heat to said ingredients in said mixture carried by said mixer at least during Steps 2 and 5, and
   (7) withdrawing said mixture of ingredients from said mixer upon a sufficient amount of said solvent being removed from said mixture by said vacuum source,
   wherein said mixture of ingredients may be conveniently formed into railroad brake shoes.

2. A method as defined by claim 1 and further characterized by said method particularly adapted for a batch processing of said composition friction material
   said mixer having a sealable mixing chamber with said mixing means rotatively carried within said chamber,
   said source of vacuum having an intake port connected to said mixing chamber and a condensing and reservoir means connected between said chamber and said vacuum source,
   means for heating said mixing chamber and carried thereby,
   said Step 1 including preheating said mixing chamber to a temperature proximating 200° F. (86° C.) with said heating means,
   said elastomer in step 1 including a crumb elastomer such as butadiene-styrene synthetic rubber, said solvent being such as toluol, and said nonsolvent absorbing materials being such as iron grit, galena and mullite, operating said mixer in said Step 2 with said mixing means energized for a period of time proximating five minutes, de-energizing said mixer and placing said mixer in an unsealed condition upon completion of Step 2, said curing agents in Step 3 including a resin curing agent such as hexa and said solvent absorbing materials including fibers such as asbestos, condensing said solvent vapors drawn off by said vacuum source and collecting said condensed solvent in said reservoir, wherein said ingredients are formed by said method into pellets of friction material which may be conveniently formed into railroad brake shoes.

3. A method defined by claim 2 and further characterized by, said source of vacuum drawing a vacuum on said mixing chamber proximating 28 inches of mercury, wherein said pellets are substantially free of said solvent upon completion of said method.

4. Apparatus for preparing friction materials which can be conveniently formed into railroad braking devices, said means comprising, a mixer having, an elongated cylindrical-shaped, sealable chamber, a first mixing means within said chamber including a drive shaft rotatively carried by ends of said chamber and spaced plow means carried by said shaft to circle about an inner circumferent surface of said chamber, and a second mixing means within said chamber, said second means including chopper means positioned between said spaced plow means and adjacent to said inner chamber surface and carried on a drive shaft positioned transversely to said plow shaft, heating means for adding heat to ingredients in said mixing chamber, said means carried about on outer circumferent surface of said chamber, filtering means to remove particulate matter from a solvent in a vapor state, said filtering means having an intake connected to said chamber, condensing means to change said solvent vapor into a liquid state, said condensing means having an intake connected to an outlet of said filtering means, reservoir means for collecting said solvent changed from said vapor state to said liquid state by said condensing means, said reservoir means having an inlet connected to a discharge of said condensing means, and vacuum source means to reduce pressure in said chamber to less than ambient atmosphere pressure, said vacuum means having an intake connected to said reservoir means, wherein said friction material may be made in an energy efficient and environmental protective manner by charging said chamber of said mixer with a first portion of ingredients to fill proximately 11 percent of a holding capacity of said mixer and mixing said ingredients with said mixing means to produce a solvated paste-like substance, then adding into said mixing chamber a second portion of said ingredients and mixing said ingredients to produce a mixture thereof which upon being subjected to heat from said heating means and vacuum from said vacuum source dries by withdrawal of said solvent.

5. A method of preparing a composition friction material particularly adapted for forming therefrom railroad brake shoe liners, said method comprising the steps of:

(1) preheating a mixer to a selective temperature proximating 200° F. (86° C.), (2) placing said mixer in a condition to receive a first batch of ingredients therein, (3) loading into said mixer said batch of ingredients including a selective amount of a crumbed elastomer, an elastomer curing agent, a solvent and nonsolvent absorbing granulated fillers, (4) placing said mixer in a sealed condition, (5) activating for a selective first time period said mixer to cause intense mixing of said ingredients by plow means and chopper means rotating within said mixer, (6) solvating said crumbed elastomer into a paste-like consistency having a substantially uniform dispersion therein of said remaining ingredients, (7) deactivating said mixer and placing said mixer in an unsealed condition to receive additional ingredients, (8) loading into said mixer a second batch of ingredients including a selective amount of fibers, solvent absorbing granulated fillers, resin curing agent and granulated friction modifiers, (9) placing said mixer in a sealed condition,

(10) activating said mixer for a second selective time period to cause intense mixing of said first and second batch of ingredients by said plow means and said chopper means,

(11) adding a selective amount of liquid resin such as a selective amount of a cashew nut shell liquid resin into said mixer for a third selective time period commencing after a lapse of a portion of said second time period.

(12) activating a vacuum source to draw a vacuum on said mixer concurrently with a beginning of said third selective time period,

(13) deactivating said chopper means upon a lapse of said second time period,

(14) mixing said ingredients by said plow means for a fourth selective time period,

(15) heating said mixer during Steps 2 through 14,

(16) deactivating said mixer and said vacuum source, and

(17) placing said mixer in an unsealed condition to allow removal of said composition friction material.

6. A method of preparing a composition friction material particularly adapted for making railroad brake shoe liners, said method comprising the steps of:

(1) loading into a mixer a first portion of ingredients including an elastomer, a curing agent for said elastomer, a solvent, and nonsolvent absorbing materials, (2) mixing said first ingredient portion with mixing means carried by said mixer to produce a solvated paste-like substance, (3) adding to said solvated paste a second portion of said ingredients including solvent absorbing materials, a resin curing agent and friction modifiers, (4) mixing said first and second ingredient portions to produce a mixture thereof in said mixer, (5) adding a resin to said mixture in said mixer, (6) energizing a vacuum source connected to said mixer to remove in part said solvent in said mixture,
(7) mixing said resin and said ingredients to produce a further mixture,
(8) heating said ingredients in said mixer, at least during Steps 2 and 7, with heating means carried by said mixer,
(9) withdrawing said mixture from said mixer upon a sufficient amount of said solvent being removed,
wherein said mixture of ingredients may be conveniently formed into railroad brake shoes.

* * * * *